US006422471B2

(12) United States Patent
Kowalski

(10) Patent No.: US 6,422,471 B2
(45) Date of Patent: *Jul. 23, 2002

(54) PCMCIA MODULE INCLUDING A CHIP CARD INTERFACE

(75) Inventor: Bernd Kowalski, Siegen (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,852

(22) PCT Filed: Jun. 12, 1996

(86) PCT No.: PCT/DE96/01074

§ 371 (c)(1),
(2), (4) Date: May 18, 1998

(87) PCT Pub. No.: WO97/07480

PCT Pub. Date: Feb. 27, 1997

(30) Foreign Application Priority Data

Aug. 18, 1995 (DE) .......................... 195 30 363

(51) Int. Cl.⁷ ................................ G06K 19/06
(52) U.S. Cl. .................. 235/492; 235/486; 902/26
(58) Field of Search ................ 235/492, 380, 235/381, 486, 382, 487; 902/26; 361/737

(56) References Cited

U.S. PATENT DOCUMENTS

| 4,797,542 | A | | 1/1989 | Hara | 235/380 |
| 5,049,728 | A | * | 9/1991 | Rovin | 235/492 |
| 5,477,418 | A | * | 12/1995 | MacGregor et al. | 361/737 |
| 5,486,687 | A | * | 1/1996 | Le Roux | 235/382 |
| 5,500,517 | A | * | 3/1996 | Cagliostro | 235/486 |
| 5,563,400 | A | * | 10/1996 | Le Roux | 235/486 |
| 5,596,562 | A | * | 1/1997 | Chen | 369/124 |
| 5,649,224 | A | * | 7/1997 | Scheer | 395/800 |
| 5,808,336 | A | * | 9/1998 | Miyawaki | 257/315 |

FOREIGN PATENT DOCUMENTS

| EP | 0 531 671 A2 | 3/1993 |
| EP | 0 552 078 | 7/1993 |
| FR | 2 701 133 | 8/1993 |

OTHER PUBLICATIONS

"Information Technology—identification cards—integrated circuit(s) cards with contacts", ISO/IEC 7816–2:1994(E), 6 pages No date.

*Khanide, "Gute Karten für die Zukunft," Funkschau Feb. 1994, pp. 76–79.

* cited by examiner

Primary Examiner—Michael G. Lee
Assistant Examiner—Daniel St. Cyr
(74) Attorney, Agent, or Firm—Kenyon & Kenyon

(57) ABSTRACT

A PC card has, in addition to the normal plug-and-socket interface, a standard or modified chip card interface analogous to ISO 7816 ff and is personalized therewith. The PC card can be used in standard PC applications, but also personalized and used as chip cards.

2 Claims, 1 Drawing Sheet

PCMCIA MODULE INCLUDING A CHIP CARD INTERFACE

BACKGROUND INFORMATION

Modules containing microprocessors, memories, and a plug-and-socket connector are known. Such a module is offered, for example, under the name of PCMCIA (Personal Computer Memory Card International Association) and is described in more detail in Funkschau 2/1994, pp. 76–79 by Fereydun Khanide in "Gute Karten für die Zukunft" (Good cards for the future).

Such modules are designed as additional PC cards thus allowing their application range to be expanded. For many applications it is necessary, or at least recommended, that such a module be personalized. This, however, requires a complex procedure that increases the cost.

Some conventional processor chip cards are being increasingly used as individual electronic encryption devices, for which they are also personalized. Due to their external dimensions and the type of their electrical contacts, these are the dominant media in this application field.

The following properties of chip cards are useful for this purpose:
1. standard external dimensions, mechanical properties, and interface,
2. compact storage (stackable),
3. simple transportation by the user,
4. (invisible when) carried on the user's body,
5. numerous plug-in cycles in different terminals, and
6. cost-effective mechanical-electrical processing of large numbers in loading individual encryption means or other data during the card production process (hereinafter referred to as "personalizing").

Processor chip cards have, however, a at least one shortcoming: due to the mechanical specifications of ISO Standard 7816 regarding their flexibility, thickness, and interface, the size of their semiconductor chip is limited to approximately 25 cm$^2$. This limits the processor performance of the chip card, and makes it unsuitable for use in many applications, such as, for example, quick data encryption.

The PCMCIA module, for example, is an alternative to the chip card. It has the same external dimensions, except thickness, as a chip card. The thickness, for example, can be selected with enclosure type I or II (max. thickness=3.5 mm) so that a complete microprocessor architecture can be accommodated. The four-pole interface to the outside allows data transfer rates of up to 30 Mbit/s as opposed to approximately 10 kbit/s for the chip card.

Of the six aforementioned properties of the chip card, the PCMCIA module has the first five and is therefore an almost ideal alternative to the chip card.

The four-pole interface of the PCMCIA allows high processing rates in operation, but is a disadvantage from the following points of view:
a. increased mechanical wear due to complex plug-in contacts; therefore fewer plug-in cycles;
b. interface contact contamination hazard; thence the need for a protective case for transport on a person's body;
c. complex mechanical guidance and contacting during the personalization process; therefore this step can only be automated at a high cost;
d. conventional chip card personalization systems cannot be used for PCMCIA modules as well.

A PCMCIA chip card, onto which an ISO chip card can be installed. The ISO chip card can be personalized and is designed so that it can exchange data with the PCMCIA chip card. For this purpose contacts are provided on both the PCMCIA chip card and the ISO chip card. Only when the personalized ISO chip card is installed on the PCMCIA chip card and is in contact with the latter can the PCMCIA chip card be accessed. A disadvantage of this card combination is that a separate personalized ISO chip card is needed in order to access the PCMCIA chip card.

SUMMARY OF THE INVENTION

An object of the present invention is to eliminate the above disadvantages of the module, in particular of the PCMCIA module.

The object can be achieved with a module having a chip card interface analogous to ISO 7816 ff. The chip card interface permits the module to be personalized.

DETAILED DESCRIPTION

Figure 1:
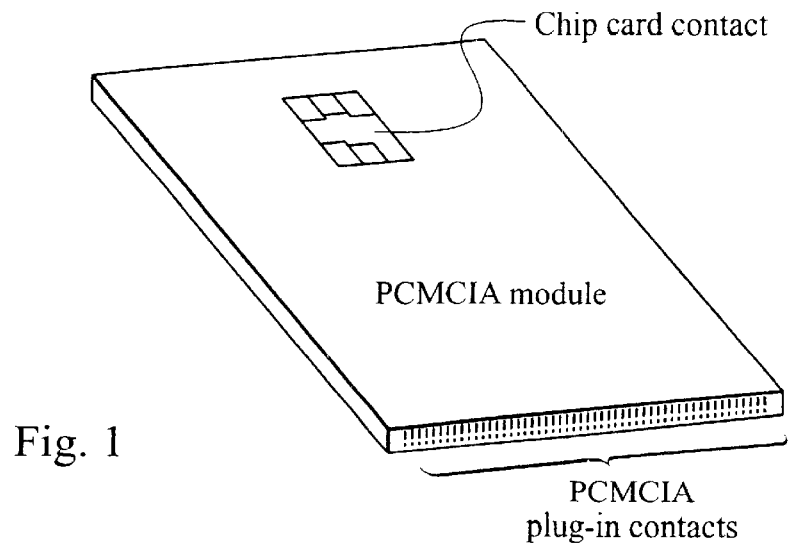
FIG. 1 shows a chip card contact according to the present invention.

The present invention provides an interface in a PCMCIA module either as an alternative or as an additional interface. Various options are available for doing this, such as, for example, an ISO 7816 ff chip card interface, illustrated in FIG. 1.

In the case of an additional chip card interface, the features of the PCMCIA module are preserved unchanged, and the module also may provide the features of a chip card.

The use of the chip card interface can be limited to the personalization process, since it cannot offer the full range of functions of a PCMCIA interface that are usually required for "normal operation."

The chip card interface provides a power supply option for at least one part of the internal PCMCIA circuit, e.g., for the part that is used for personalization.

If the personalization process is critical from the security point of view, a program-controlled protection mechanism can be installed (programmed) so that the use of the chip card interface for personalization is only allowed once, i.e., for personalization.

The present invention also contemplates using the chip card interface of the PCMCIA module in "normal operation." This is advisable for example, when the full capabilities of the PCMCIA module are not required or when only a chip card interface is available on the terminal. However, in this case, the insertion slot of the chip card terminal must be mechanically modified due to the different thickness of the PCMCIA module as compared to the chip card.

Existing chip card personalization systems can be retrofitted in a simple manner. Then a PCMCIA module can be personalized and optionally packaged virtually as easily and quickly as a chip card.

These statements also apply, of course, when using a contactless chip card according to ISO 7816-8.

When another electric or combined electric-optical interface modified to emulate ISO 7816 ff is used, the cost of the required modification of the existing personalization systems is greater than when a conventional chip card interface is used. However, for "normal operation," high processing rates can be achieved, which would not be possible with the chip card interface.

Figure 2:
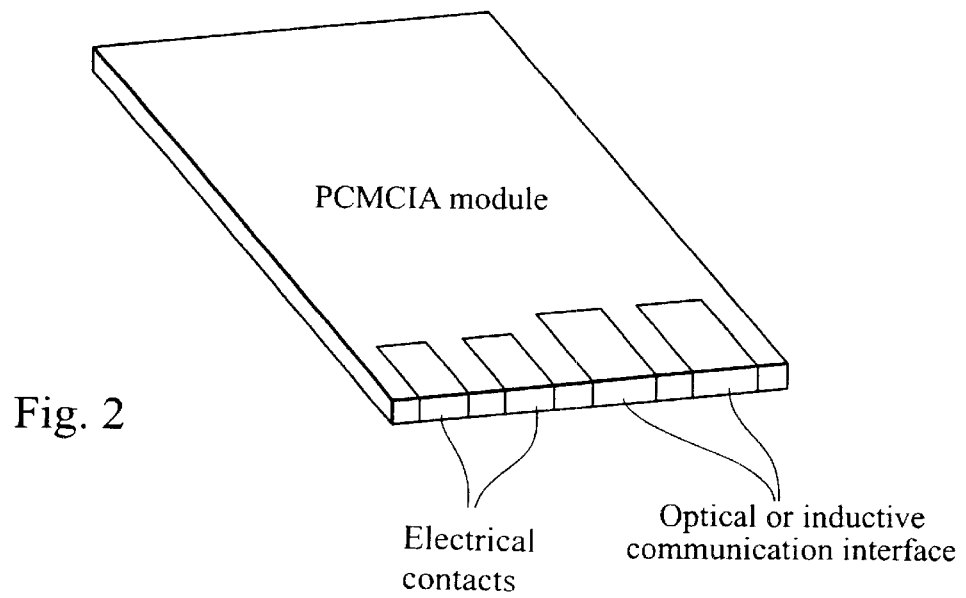
FIG. 2 illustrates an electrical or an electrical/optical contact according to the present invention.

In other embodiments of the present invention another electric interface or the combination of two electrical contacts for power supply and one optical interface for (high-speed) communication may be employed, as shown in FIG. 2. Alternatively, inductive interfaces may be employed or inductive interfaces.

What is claimed is:

1. A PC card comprising:

a microprocessor;

a least one memory;

one plug-and-socket connection including a PCMCIA interface; and a chip card interface through which the PC card can be personalized, said chip card interface implemented according to the ISO 7816 standard, wherein said chip card interface permits a one-time personalization only, said PCMCIA interface after the one-time personalization being usable with electronic key applications.

2. A PC card comprising:

a microprocessor;

at least one memory;

one plug-and-socket connection; and a chip card interface through which the PC card can be personalized, said chip card interface implemented according to the ISO 7816 standard, the chip card permitting a one-time personalization only, wherein the one plug-and-socket connection includes a PCMCIA interface and wherein after the one-time personalization the PCMCIA interface is usable with electronic key applications.

* * * * *